United States Patent
Abdelhak et al.

(10) Patent No.: US 11,875,558 B2
(45) Date of Patent: Jan. 16, 2024

(54) METHODS AND APPARATUS TO GENERATE TEMPORAL REPRESENTATIONS FOR ACTION RECOGNITION SYSTEMS

(71) Applicant: Intel Corporation, Santa Clara, CA (US)

(72) Inventors: Sherine Abdelhak, Beaverton, OR (US); Neelay Pandit, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 17/084,219

(22) Filed: Oct. 29, 2020

(65) Prior Publication Data

US 2021/0118151 A1     Apr. 22, 2021

Related U.S. Application Data

(63) Continuation of application No. 16/047,899, filed on Jul. 27, 2018, now Pat. No. 10,853,951.

(Continued)

(51) Int. Cl.
*G06V 10/82* (2022.01)
*G06T 7/246* (2017.01)
(Continued)

(52) U.S. Cl.
CPC ........ *G06V 10/82* (2022.01); *G06F 18/24133* (2023.01); *G06F 18/254* (2023.01);
(Continued)

(58) Field of Classification Search
CPC ..... G06T 7/246; G06T 7/269; G06K 9/00718; G06K 9/6271; G06K 9/6292;
(Continued)

(56) References Cited

U.S. PATENT DOCUMENTS 10,853,951 B2   12/2020   Abdelhak et al.
2003/0025794 A1*  2/2003   Fujii ....................... G06T 7/223
                                                                348/169

(Continued)

OTHER PUBLICATIONS

Lan et al., "Deep Local Video Feature for Action Recognition," 2017 IEEE Conference on Computer Vision and Pattern Recognition Workshops (CVPRW), Jan. 28, 2017, 6 pages.

(Continued)

*Primary Examiner* — Stephen P Coleman
(74) *Attorney, Agent, or Firm* — Hanley, Flight & Zimmerman, LLC

(57) ABSTRACT

Methods, apparatus, systems and articles of manufacture to generate temporal representations for action recognition systems are disclosed. An example apparatus includes an optical flow computer to compute first optical flows for a video based on computing differences between pairs of frames of the video; an evolution of trajectories (EoT) generator to generate EoT temporal representations of the video based on (a) computing second optical flows of the video and (b) aggregating ones of the second optical flows having different time spans; an action identifier to: identify first actions in the video based on the first optical flows; identify second actions in the video based on the EoT temporal representations; and identify third actions in the video based on frames of the video; and a fuser to determine a fourth action based on a weighted average of the first actions, second actions, and third actions.

21 Claims, 9 Drawing Sheets

Related U.S. Application Data

(60) Provisional application No. 62/541,638, filed on Aug. 4, 2017.

(51) Int. Cl.
| | |
|---|---|
| *G06N 5/00* | (2023.01) |
| *H04N 21/4402* | (2011.01) |
| *G06N 20/00* | (2019.01) |
| *G06T 7/269* | (2017.01) |
| *G06N 3/08* | (2023.01) |
| *G06V 20/40* | (2022.01) |
| *G06F 18/25* | (2023.01) |
| *G06F 18/2413* | (2023.01) |
| *G06N 3/045* | (2023.01) |
| *G06V 10/764* | (2022.01) |
| *G06V 10/80* | (2022.01) |

(52) U.S. Cl.
CPC .............. *G06N 3/045* (2023.01); *G06N 3/08* (2013.01); *G06N 5/00* (2013.01); *G06N 20/00* (2019.01); *G06T 7/246* (2017.01); *G06T 7/269* (2017.01); *G06V 10/764* (2022.01); *G06V 10/809* (2022.01); *G06V 20/41* (2022.01); *H04N 21/440281* (2013.01); *G06V 20/44* (2022.01)

(58) Field of Classification Search
CPC ....... G06K 2009/00738; G06N 3/0454; G06N 3/08; G06N 5/00; G06N 20/00; H04N 21/440281

USPC ......................................................... 382/103
See application file for complete search history.

(56) References Cited

U.S. PATENT DOCUMENTS

| | | | |
|---|---|---|---|
| 2005/0069207 | A1 | 3/2005 | Zakrzewski et al. |
| 2008/0122926 | A1* | 5/2008 | Zhou ...................... G06T 7/215 |
| | | | 348/E7.086 |
| 2011/0211812 | A1 | 9/2011 | Tzoukermann et al. |
| 2013/0258202 | A1* | 10/2013 | Gaddy .................. H04N 5/147 |
| | | | 348/699 |
| 2017/0186176 | A1* | 6/2017 | Paluri .................. G06V 10/764 |
| 2017/0255832 | A1 | 9/2017 | Jones et al. |

OTHER PUBLICATIONS

Wang et al., "Temporal Segment Networks: Towards Good Practices for Deep Action Recognition," arXiv:1608.00859v1 [cs.CV], Aug. 2, 2016, 16 pages.

United States Patent & Trademark Office, "Non-Final Office Action," issued in connection with U.S. Appl. No. 16/047,899, dated Feb. 13, 2020, (13 pages).

United States Patent & Trademark Office, "Notice of Allowance and Fee(s) Due," issued in connection with U.S. Appl. No. 16/047,899, dated Aug. 6, 2020, (10 pages).

* cited by examiner

| | METHOD | ACCURACY ON HMDB51 DATASET |
|---|---|---|
| 2 Representations | RGB + FLOW | 68.5% |
| | EOT + RGB | 70.3% |
| | EOT + FLOW | 60.9% |
| 3 Representations | TSN (competitive approach): RGB + FLOW + WARP FLOW | 69.4% |
| | Our Approach: EOT + RGB + FLOW | 71.8% |

FIG. 6

METHODS AND APPARATUS TO GENERATE TEMPORAL REPRESENTATIONS FOR ACTION RECOGNITION SYSTEMS

RELATED APPLICATION

This patent claims priority to U.S. patent application Ser. No. 16/047,899, (now U.S. Pat. No. 10,853,951) which was filed on Jul. 27, 2018, and entitled "Methods and Apparatus to Generate Temporal Representations for Action Recognition Systems," which claims priority to U.S. Provisional Patent Application Ser. No. 62/541,638, which was filed on Aug. 4, 2017, and entitled "Methods and Apparatus to Improve Video-Based Action Recognition." U.S. patent application Ser. No. 16/047,899 and U.S. Provisional Patent Application Ser. No. 62/541,638 are hereby incorporated herein by reference in their entirety.

FIELD OF THE DISCLOSURE

This disclosure relates generally to action recognition systems and, more particularly, to methods and apparatus to generate temporal representations for action recognition systems.

BACKGROUND

Action recognition systems identify actions in video data. Example human actions include, but are not limited to, walking, falling on the floor, running, fighting, eating, smoking, swinging a bat, etc. Action recognition systems have a broad range of applications such as security systems, behavioral analysis, patient monitoring, smart-home systems, photography domains, etc.

BRIEF DESCRIPTION OF THE DRAWINGS

FIG. 6 is an example table demonstrating additional example performance improvements arising from the examples disclosed herein.

Figure 1:
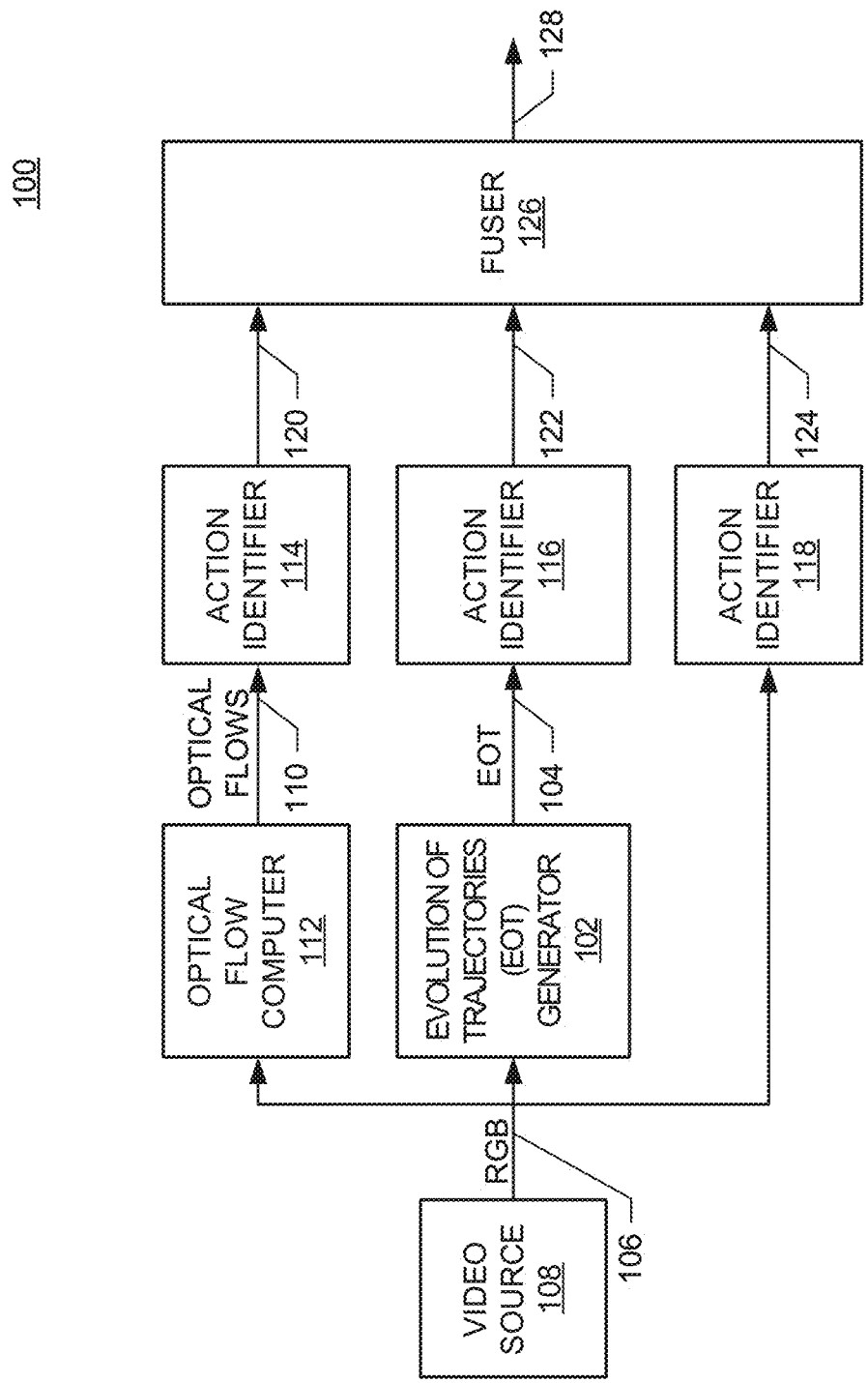
FIG. 1 illustrates an example evolution of trajectories (EoT) generator constructed in accordance with teachings of this disclosure, and shown in an example environment of use.

As beneficial, the same reference numbers will be used throughout the drawing(s) and accompanying written description to refer to the same or like parts. Connecting lines or connectors shown in the various figures presented are intended to represent example functional relationships, physical couplings and/or logical couplings between the various elements.

DETAILED DESCRIPTION

A primary database that the research community uses to validate results of motion detection and/or classification systems is the 51 action class human motion database (HMDB51) For example, state-of-the-art sparse-sampling methods have been able to achieve approximately 69% accuracy. Example approaches disclosed herein are based on EoT temporal representations that significantly improve on those results, achieving 71.8% accuracy. Such improvements are a result of (1) the ability of example EoT approaches disclosed herein to capture longer-range temporal structures, and (2) the ability of example EoT approaches disclosed herein to retain short-term, high-level motion dynamics as a textured history of motion.

Action recognition and/or activity recognition algorithms can be divided roughly into two categories based on the sampling methods applied to the input data sets (e.g., videos). Sparse sampling methods do not sample (and/or process) every frame of the input video, but instead process selected frames. Sparse sampling approaches are desirable in memory-constrained and computationally-constrained devices. Dense sampling methods process more frames, e.g., each frame, of the video. Example EoT temporal representation approaches disclosed herein utilize temporal representations that are applicable to sparse sampling methods, thus having lower memory and computational requirements than dense sampling methods, while having action recognition accuracies greater than sparse sampling and similar to dense sampling methods.

An example sparse sampling method is known as Temporal Segment Networks (TSN) (Wang et al., "Temporal Segment Networks: Towards Good Practices for Deep Action Recognition," European Conference on Computer Vision, Oct. 8-16, 2016, 16 pages, which is incorporated herein in its entirety). The TSN approach has achieved the previous state-of-the-art accuracy of 69.4% for the HMDB51 database. The TSN approach sparsely samples short snippets from a given video. RGB frames and stacked optical flow frames are extracted from the short samples. Each of these short samples is classified to an action class using a convolutional neural network (CNN). For the input video, each of these short frame action predictions are aggregated into a video-level prediction. Loss values of the video-level prediction are used for updating model weights during training. A major shortcoming of the TSN approach is its inability to capture long range motion features. The stacked optical flow frames used in TSN can only aggregate 2-4 consecutive optical flow frames. Some actions cannot be discriminated accurately using only short-term motion. In contrast, example EoT temporal representations approaches disclosed herein are able to encode long-term motion and short-term motion and, hence, improve accuracy.

An example dense sampling method is known as Deep Local Video Features (DOVF) (Lan et al., "Deep Local Video Feature for Action Recognition," IEEE Conference on Computer Vision and Pattern Recognition Workshops (CVPRW), Jul. 21-26, 2017, 6 pages, which is incorporated herein in its entirety). The DOVF approach achieves an accuracy of 75% for the HMDB51 database. The DOVF approach reuses pre-trained neural networks from the TSN approach, and operates on RGB frames and stacked optical flow frames. A dense sampling of features is produced by extracting the outputs of fully connected and global pooling layers of a CNN and select inception vectors for each video frame. These features are combined using maximum pooling layer(s) to produce global features. These combined features, used as global features, are mapped to the action classes. The DOVF approach captures long-term motion features, but does so because it is able to perform dense sampling. Multiple feature vectors from an RGB and optical flow CNN are extracted for each video frame. The downside of the DOVF approach is that it requires significantly higher computational cost because it belongs to the dense sampling category. In contrast, example EoT temporal representations approaches disclosed herein are able to benefit from both sparse and dense sampling approaches, in that the example approaches disclosed herein retain a lightweight sparse-sampling design while generating more accurate global features.

As mentioned in the sections above, example EoT temporal representation approaches disclosed herein are applicable to sparse-sampling methods used for activity recognition algorithms. A major issue faced by sparse sampling approaches is their susceptibility to learn non-discriminative features, especially when dealing with different actions that contain similar temporal structures. For example, eating, smoking and drinking all include the motion of a hand being raised. This inter-class similarity of motion components can lead to false-label assignment during training and misclassification during testing and/or use. Representations and architectures can focus on extracting more discriminative spatial features or extracting higher-level patterns of motion to improve recognition. Additionally, the optimal set of motion descriptors for different activities may depend on variable combinations of low-level and high-level motion patterns. To address these concerns, example EoT approaches disclosed herein target a new temporal representation that encodes a spectrum of low-level and high-level motion patterns. Example EoT temporal representations approaches disclosed herein capture low-level and high-level features without the loss of discriminative features by adaptively normalizing magnitude vectors based on overall motion, subsequently aggregating motion vectors calculated for multiple temporal resolutions, thereby capturing long-range and short-term temporal structures and motion dynamics as a textured history of motion. As a result, example EoT temporal representations approaches disclosed herein improve results for the HMDB51 database—accuracy of 71.8% for EoT versus 69.4% for TSN.

As shown above, example EoT temporal representation approaches disclosed herein improve the accuracy of action recognition and/or decrease complexity. Smart homes have become an important and evolving segment of action recognition. Because of their lower complexity and/or increased accuracy, example EoT approaches disclosed herein are capable of being implemented on and providing the action recognition accuracy required for smart home devices.

Reference will now be made in detail to non-limiting examples, some of which are illustrated in the accompanying drawings.

FIG. 1 illustrates an example action recognizer 100 including an example EoT generator 102 constructed in accordance with teachings of this disclosure. The example EoT generator 102 generates EoT temporal representations 104 from example video 106 output by an example video source 108. The example EoT generator 102 generates the EoT temporal representations 104 by computing and aggregating together a plurality of optical flows having different time spans. An example optical flow is an image that represents the movement(s) of portions of an image (e.g., differences between frames). In example optical flows, the greater the magnitude of a pixel (e.g., the darker or blacker the pixel) the larger the amount of motion associated with the pixel. The EoT generator 102 adaptively normalizes the optical flows before aggregation based on overall motion to avoid loss of discriminative features, so the EoT temporal representations 104 represent long-range and short-term temporal motion.

In the illustrated example of FIG. 1, the video 106 includes conventionally formed frames of video of red (R), green (B) and blue (B) pixels. Other video formats may be used. Example video sources 108 include video cameras, video playback devices, video storage devices, gaming consoles, etc.

To compute optical flows 110 from the example video 106 output by the example video source 108, the example action recognizer 100 of FIG. 1 includes an example optical flow computer 112. The example optical flow computer 112 of FIG. 1 computes the optical flows 110 by computing differences between pairs of frames of the video 106.

To identify actions, the example action recognizer 100 of FIG. 1 includes example action identifiers 114, 116 and 118. The example action identifier 114 of FIG. 1 identifies actions in the video 106 based on the optical flows 110. The example action identifier 116 of FIG. 1 identifies actions in the video 106 based on the EoT temporal representations 104. The example action identifier 118 of FIG. 1 identifies actions in the video 106 based on frames of the video 106. In some examples, the example action identifiers 114, 116 and 118 are machine learning engines such as convolutional neural networks (CNN). In some examples, the action identifiers 114, 116 and 118 are trained using supervised learning. For example, an action identifier is provided inputs and corresponding correct outputs, the action identifier computes differences between its outputs and the provided correct outputs and uses differences to update its internal coefficients.

To combine respective outputs 120, 122 and 124 of the action identifiers 114, 116 and 118, the example action recognizer 100 of FIG. 1 includes an example fuser 126. The example fuser 126 of FIG. 1 computes a weighted average of the outputs 120, 122 and 124 to determine a final output 128 that represents an identified action. Example methods to compute the weighted average are described in Lan et al. and Wang et al. cited above. While three action identifiers 114, 116 and 118 are shown in FIG. 1, other numbers of action identifiers may be implemented.

While an example manner of implementing the action recognizer 100 is illustrated in FIG. 1, one or more of the elements, processes and/or devices illustrated in FIG. 1 may be combined, divided, re-arranged, omitted, eliminated and/or implemented in any other way. Further, the example EoT generator 102, the example optical flow computer 112, the example action identifiers 114, 116 and 118, the example fuser 126 and/or, more generally, the example action recognizer 100 of FIG. 1 may be implemented by hardware, software, firmware and/or any combination of hardware, software and/or firmware. Thus, for example, any of the example EoT generator 102, the example optical flow computer 112, the example action identifiers 114, 116 and 118, the example fuser 126 and/or, more generally, the example action recognizer 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example EoT generator 102, the example optical flow computer 112, the example action identifiers 114, 116 and 118, the example fuser 126 and/or the example action recognizer 100 is/are hereby expressly defined to include a non-transitory computer-readable storage device or storage disk such as a memory, a digital versatile disk (DVD), a compact disc (CD), a Blu-ray disk, etc. including the software and/or firmware. Further still, the example action recognizer 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
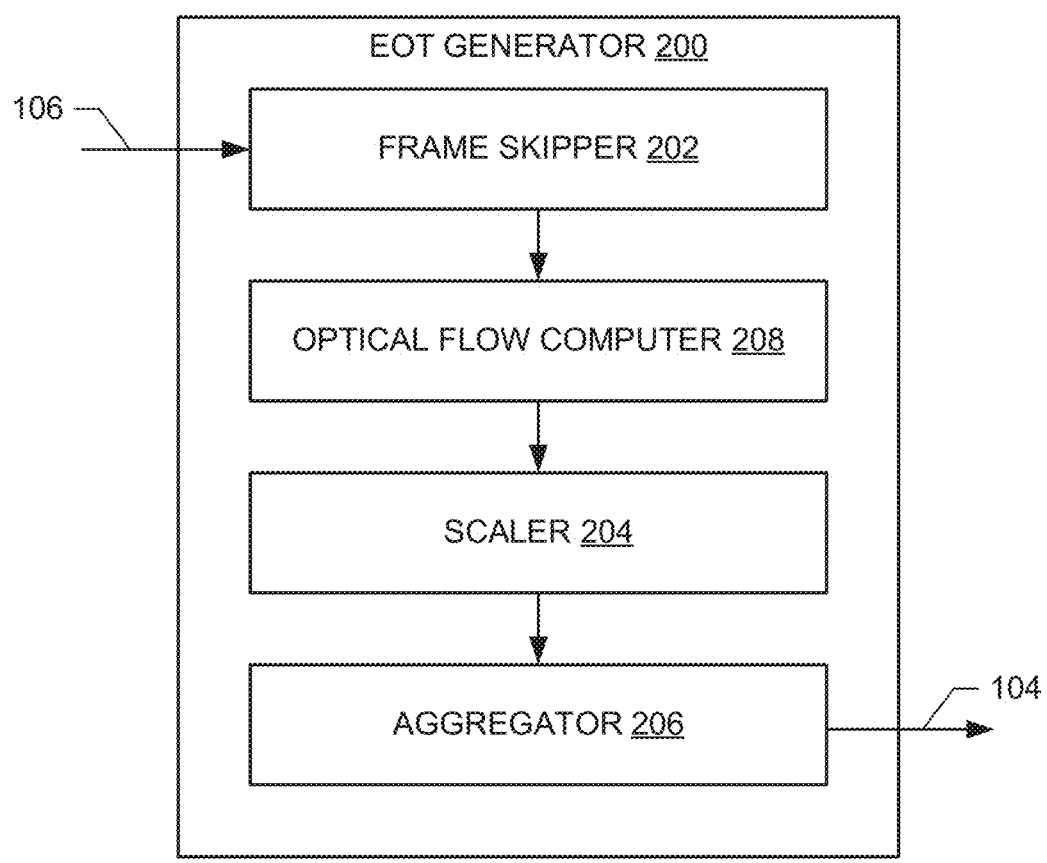
FIG. 2 is a block diagram illustrating an example implementation for the example EoT generator of FIG. 1.

FIG. 2 is a block diagram illustrating an example EoT generator 200 that may implement the example EoT generator 102 of FIG. 1. To ignore frames of the video 106 representing small amounts of motion, the example EoT generator 102 includes an example frame skipper 202. The example frame skipper 202 of FIG. 2 applies a dynamic frame skipping process before motion features are calculated. Dynamic frame skipping transcoders have been previously applied to action recognition for noise reduction purposes, producing more compact trajectories, and to reduce the computational complexity of trajectory extraction. In examples disclosed herein, the frame skipper 202 applies dynamic frame skipping to maintain a minimum level of motion flux (e.g., change), which indirectly normalizes the rates at which activities occur. Subsequent steps for magnitude scaling (e.g., by an example scaler 204) and aggregation (e.g., by an aggregator 206) rely on the assumption that there is a minimum level of motion for any time interval. Methods to calculate image similarity such as mean-squared error are sensitive to non-activity related image differences such as lighting condition changes, noise, and camera motion. Instead, example approaches disclosed herein use a joint entropy E measure of image similarity that is better able to focus on object motion. In some examples, entropy E is calculated using the mathematical expression of EQN (1).

$$E(X, Y) = \sum_{i \in X} \sum_{j \in Y} \frac{p(i, j) \log(p(i, j))}{\log(p(X, Y))}, \quad \text{EQN (1)}$$

where (i, j) refers to coordinates of a pair frames X and Y associated with a potential optical flow. The example frame skipper 202 determines whether to skip (e.g., discard) a frame X based of a comparison of the entropy E(X,Y) associated with the pair of frames X and Y. In some example, the frame skipper 202 skips the frame X when its associated entropy E(X,Y) does not exceed the threshold. An example threshold computed by the skipper 202 is a maximum difference between values of the frame X and the mean similarity value for the video.

Example similarity metrics include a cosine similarity, a structural similarity, etc., which are very sensitive to common video artifacts such as camera shake, rotations, motion blur, etc. Other examples include a statistical measure of similarity computed by comparing grayscale intensity distributions of images. Joint entropy is a similarity metric that is a measure of uncertainty of the histograms of both images containing the same information. Joint entropy can be calculated by comparing the joint entropy to the marginal entropies of each image. The similarity metric used to generate the example results shown in this disclosure to remove frames are determined for and applied to videos individually. The mean of consecutive inter-frame similarity scores is first calculated as a baseline. Frames are pruned if they generate values indicating dissimilarity above an empirically determined threshold from the baseline.

Figure 3:
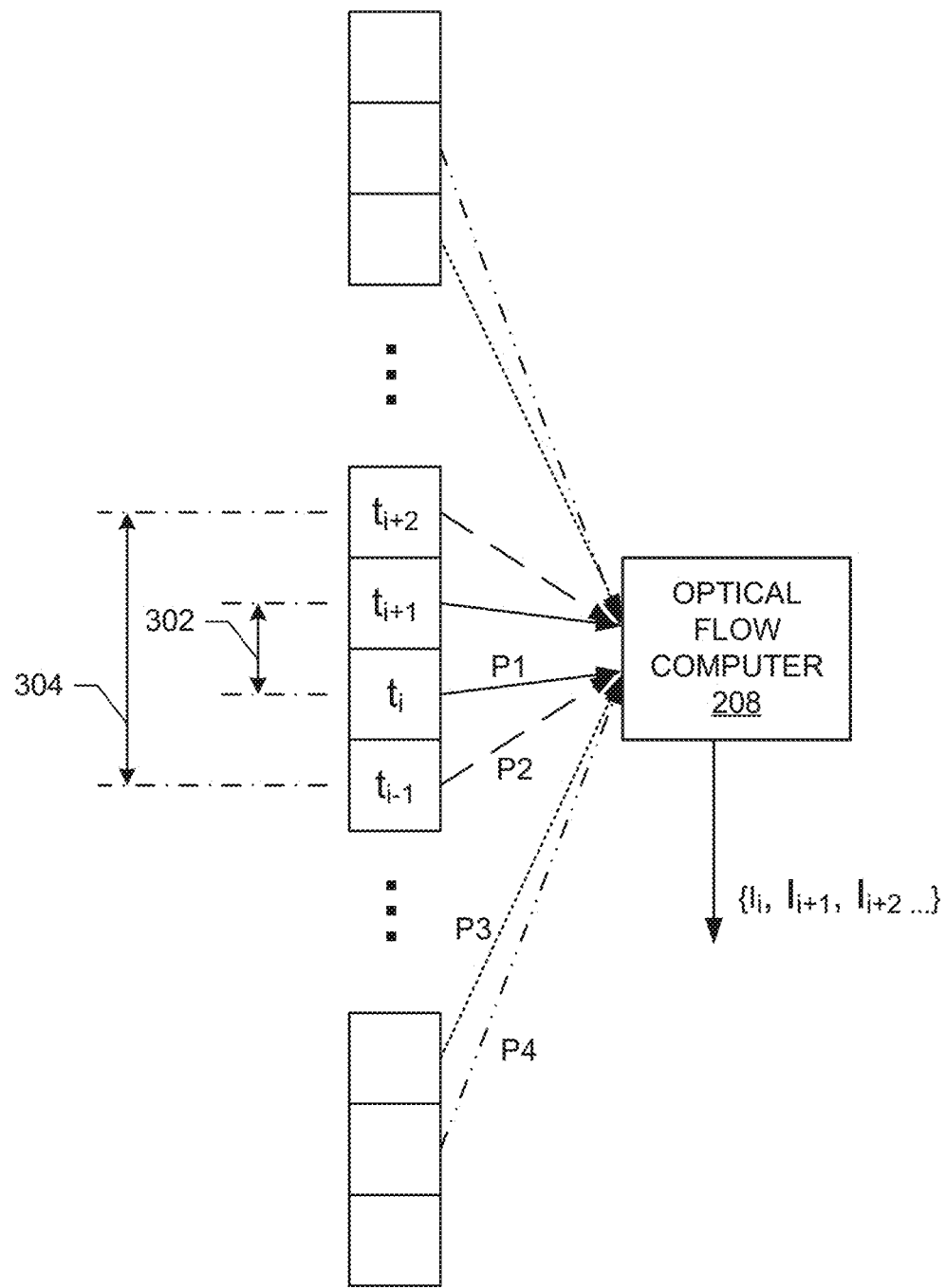
FIG. 3 is a block diagram illustrating an example computation of optical flows.

To compute optical flows, the example EoT generator 200 includes an example optical flow computer 208. The example optical flow computer 208 of FIG. 2 prepares (e.g., computes, calculates, etc.) optical flows for the frames selected (e.g., not skipped) by the frame skipper 202. As shown in FIG. 3, the example optical flow computer 208 computes optical flows 110 between pairs P1, P2, . . . of frames of the video 106 that are successively further apart. For example, for a video 106 having non-skipped frames 1 . . . $t_{i-2}, t_{i-1}, t_i, t_{i+1}, t_{i+2}, t_{i+3}$ . . . }, the optical flow computer 208 computes optical flows . . . $I_i, I_{i+1}, I_{i+2}$ . . . for respective pairs of frames . . . P1={$t_i, t_{i+1}$}, P2={$t_i t_{i+2}$} and P3={$t_{i-2}, t_{i+3}$} . . . of the video 106. As shown in FIG. 3, the pair of frames P1={$t_i, t_{i+1}$} are separated by a first amount of time Δt 302, and the pair of frames P2={$t_i, t_{i+2}$} are separated by a second different amount of time Δt 304. In some examples, an optical flow . . . $I_i, I_{i+1}, I_{i+2}$ . . . is a grayscale difference between the frames of a pair P1, P2, P3 . . . of frames. This set of optical flows . . . $I_i, I_{i+1}, I_{i+2}$ . . . represents a high-dimensional descriptor of both high and low level motion. In some examples, the number of pairs is fixed. Additionally, and/or alternatively, the number of pairs is selected based on types of actions expected in the video (e.g., based on genre). In still other examples, the number of pairs is adaptively selected and may change during the video.

To scale optical flows, the example EoT generator 200 includes the example scaler 204. Given that optical flow grayscale intensities are time-independent measures, the example scaler 204 of FIG. 2 scales the optical flows . . . $I_i, I_{i+1}, I_{i+2}$ . . . with the interval lengths Δt (e.g., amounts of time) between pairs of frames used to compute an optical flow. In some examples, there is a generally constant level motion in the activity, e.g., an integrated measure of motion magnitude would scale linearly with time. In some examples, the example scaler 204 computes a scaled optical flow having a grayscale magnitude $I_{magnitude}$ at coordinate (i, j) as shown in the mathematical expression of EQN (2)

$$I_{magnitude}(i,j) = \Sigma_{k=1}{}^K ((I_k(i,j) - \overline{M}), \Delta t), \quad \text{EQN (2)}$$

where K is a member of a subset S of frames the frames, $I_k$(i, j) refers to an optical flow's intensity at coordinate (i, j) of optical flow $I_k$, Δt is the total interval from frame $t_{0-max(S)}$ to $t_{0+max(S)}$, and $\overline{M}$ is the mean intensity value at (i, j) over the set Δt.

refers to the mean intensity value of the set of frames in the interval Δt between the pair of frames used to compute the optical flow $I_k$.

To combine (e.g., aggregate, sum together, add together, etc.) scaled optical flows into an EoT temporal representation 104, the example EoT generator 200 includes the example aggregator 206. The example aggregator 206 of FIG. 2 computes the EoT temporal representation 104 as a weighted sum of the scaled optical flows $I_{magnitude}(i, j)$. To reduce the effects of random variability in motion and noise that compound over time, the example aggregator 206 penalizes scaled optical flows captured for longer time intervals in terms of contribution weights. An example EoT temporal representation aggregation is shown in the mathematical expression of EQN (3)

$$I_{composite}(i, j) = \sum_{l=1}^{L} \frac{(I_l(i, j) - \overline{M})}{2^{\Delta t}}. \quad (3)$$

where $I_1(i, j)$ is the intensity value at coordinate (i, j) of magnitude frame $I_1$, and L is the maximum of the subset S.

While an example manner of implementing the action recognizer 100 of FIG. 1 is illustrated in FIG. 2, one or more of the elements, processes and/or devices illustrated in FIG. 2 may be combined, divided, re-arranged, omitted, eliminated and/or implemented in any other way. Further, the example frame skipper 202, the example optical flow computer 208, the example scaler 204, the example aggregator 206 and/or, more generally, the example EoT generator 200 of FIG. 2 may be implemented by hardware, software, firmware and/or any combination of hardware, software and/or firmware. Thus, for example, any of the example frame skipper 202, the example optical flow computer 208, the example scaler 204, the example aggregator 206 and/or, more generally, the example EoT generator 200 of FIG. 2 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example frame skipper 202, the example optical flow computer 208, the example scaler 204, the example aggregator 206 and/or the example EoT generator 200 of FIG. 2 is/are hereby expressly defined to include a non-transitory computer-readable storage device or storage disk such as a memory, a DVD, a CD, a Blu-ray disk, etc. including the software and/or firmware. Further still, the example EoT generator 200 may include one or more elements, processes and/or devices in addition to, or instead of, those illustrated in FIG. 2, and/or may include more than one of any or all of the illustrated elements, processes and devices.

Figure 4:
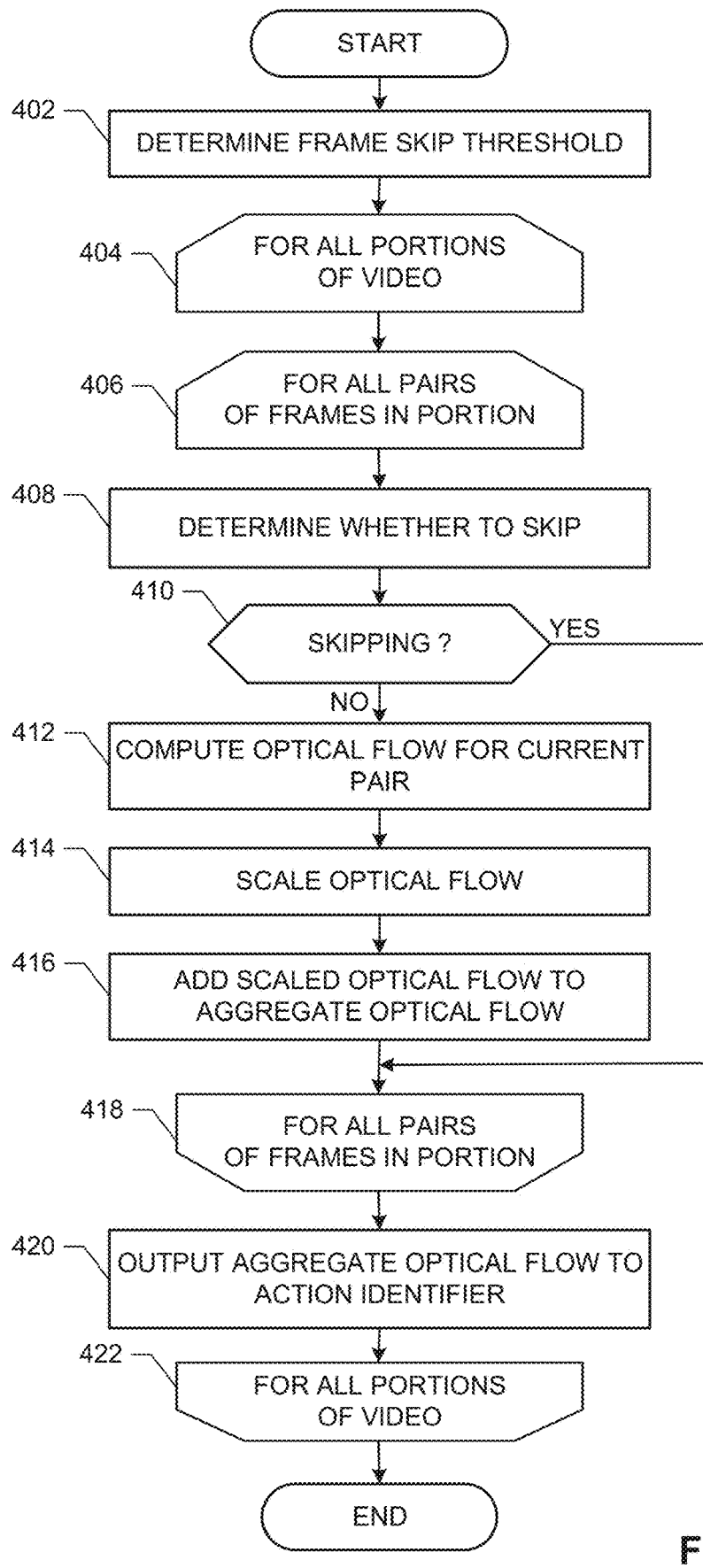
FIG. 4 is a flowchart representative of example hardware logic or machine-readable instructions for implementing the example EoT generator of FIG. 1 and/or FIG. 2 to generate EoT temporal representations.

FIG. 4 is a flowchart representative of example hardware logic or machine-readable instructions for implementing the example EoT generator 102 of FIG. 1 and/or the example EoT generator 200 of FIG. 2 to generate EoT temporal representations. The machine-readable instructions may be an executable program or portion of an executable program for execution by a computer processor such as the processor 912 shown in the example processor platform 900 discussed below in connection with FIG. 9. The program may be embodied in software stored on a non-transitory computer-readable storage medium such as a compact disc read-only memory (CD-ROM), a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 4, many other methods of implementing the example EoT generator 102 and/or 200 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine-readable instructions) stored on a non-transitory computer and/or machine-readable medium such as a hard disk drive, a flash memory, a read-only memory, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program of FIG. 4 begins at block 402 where a frame skip threshold is determined (block 402). For example, the skipper 202 computes the frame skip threshold as a mean similarity value for a video. For all portions of a video (block 404), and all pairs of frames in a portion (block 406), the skipper 202 determines whether to skip a frame (block 408). For example, the skipper 202 skips a frame when its associated entropy does not exceed the frame skip threshold. If the frame is not skipped (block 410), the optical flow computer 208 computes an optical frame from the frame and its pair P1, P2, P3 . . . , see FIG. 3 (block 412). The optical flow is scaled (block 414). For example, the scaler 204 scales the optical flow based on the mathematical expression of EQN (2). The scaled optical flow is added to the current EoT temporal representation (block 416). For example, the aggregator 206 applies the weighted sum of EQN (3) to aggregate optical flows.

If all pairs of frames in the portion have been processed (block 418), the EoT temporal representation is output (block 420). If more portions of video are to be processed (block 422), control returns to block 404 to process the next portion.

Returning to block 418, if not all pairs of the portion have been processed (block 418), control returns to block 406 to process the next pair.

Returning to block 410, if the frame is skipped (block 410), control proceeds to block 418 to determine whether more pairs are to be process.

Figure 5:
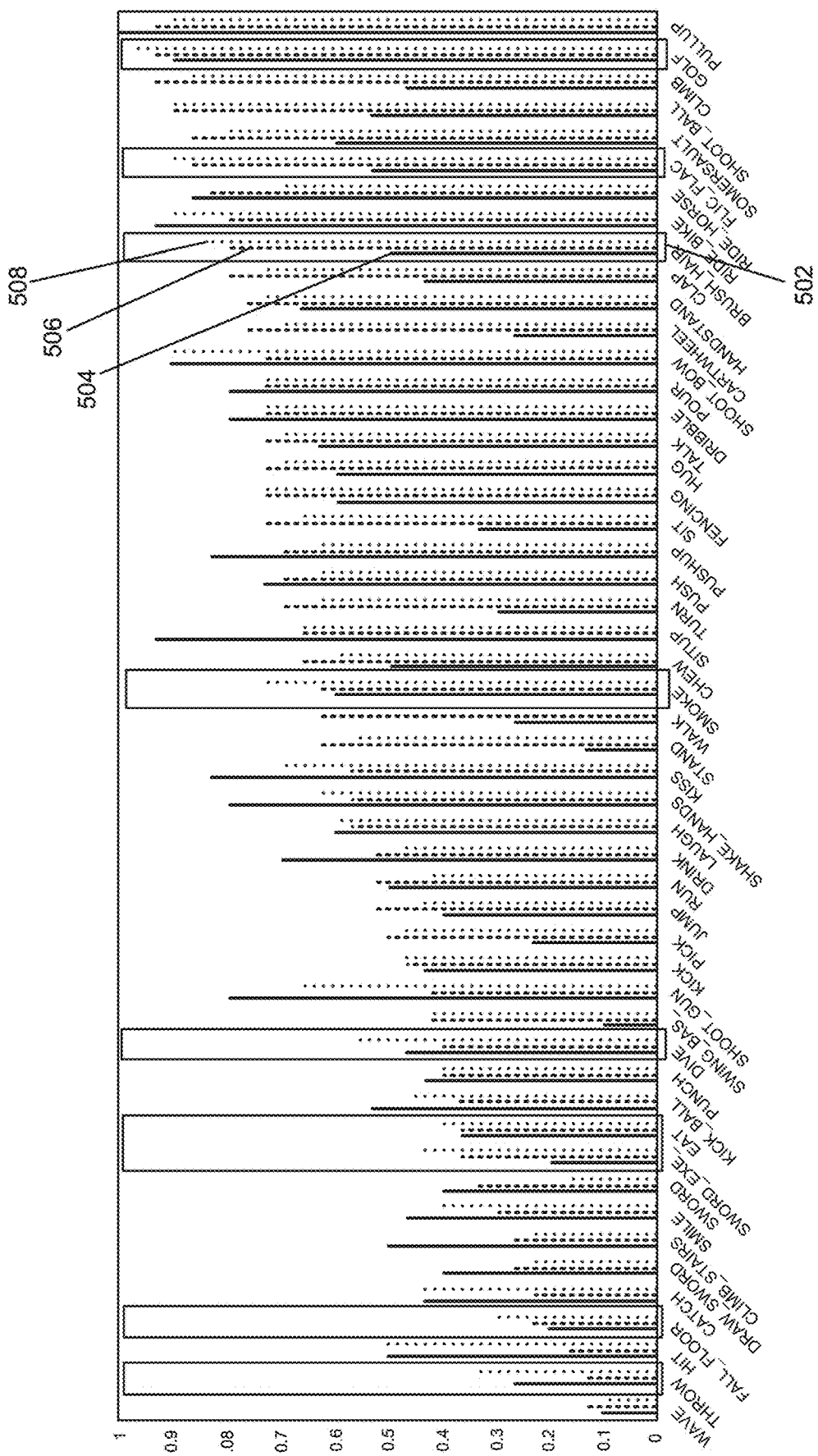
FIG. 5 is an example graph showing example performance improvements arising from the examples disclosed herein.

FIG. 5 is an example graph showing example performance improvements arising from the examples disclosed herein when tested against the HMDB51. For each action class shown on the X-axis (e.g., brush hair 502) three vertical bars are shown. The left bar (e.g., bar 504) is for action identification based on RGB frames of the video 106 (see FIG. 1), the middle bar (e.g., bar 506) is for action identification based on optical flows 110, and the right bar (e.g., bar 508) is for action identification based on EoT temporal representations 104. FIG. 5 shows per-class accuracy improvements compared to other representations. EoT based action identification is able to achieve up to a 10% improvement compared with other representations. Beneficially, at least some of those improvements are in those classes that are most relevant to surveillance and smart home, such as: fall on the floor, throw, dive, brush hair, etc.

FIG. 6 is an example table demonstrating additional example performance improvements arising from the examples disclosed herein. Similar to the approach in TSN, example approaches disclosed herein combine several representations and use a voting or fusing mechanism to achieve improved accuracy per class. FIG. 6 shows the overall accuracy when combining two representations (EoT+RGB, and EoT+Optical Flow) and three representations (EoT+RGB+Optical Flow). The latter is comparable to the TSN approach which employs three representations: RGB+Optical Flow+Warp Optical Flow.

Figure 7:
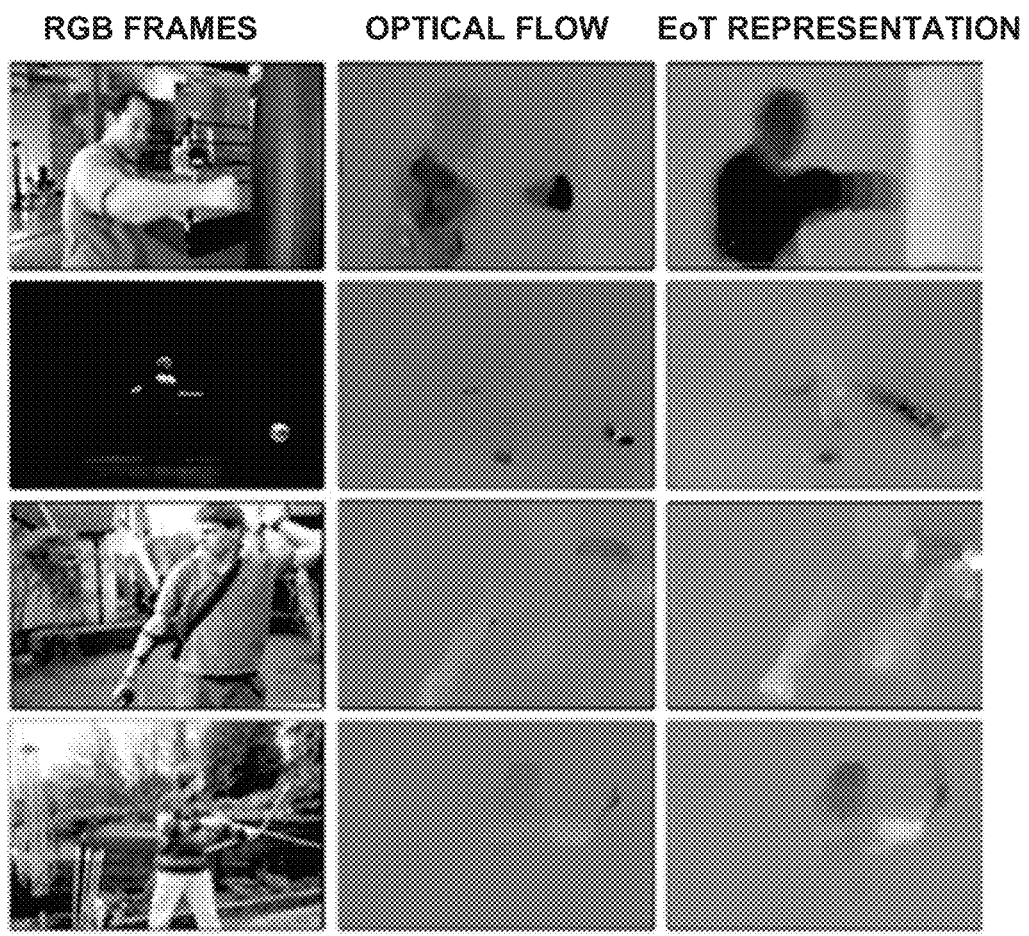
FIG. 7 shows example EoT temporal representations.
Figure 8:
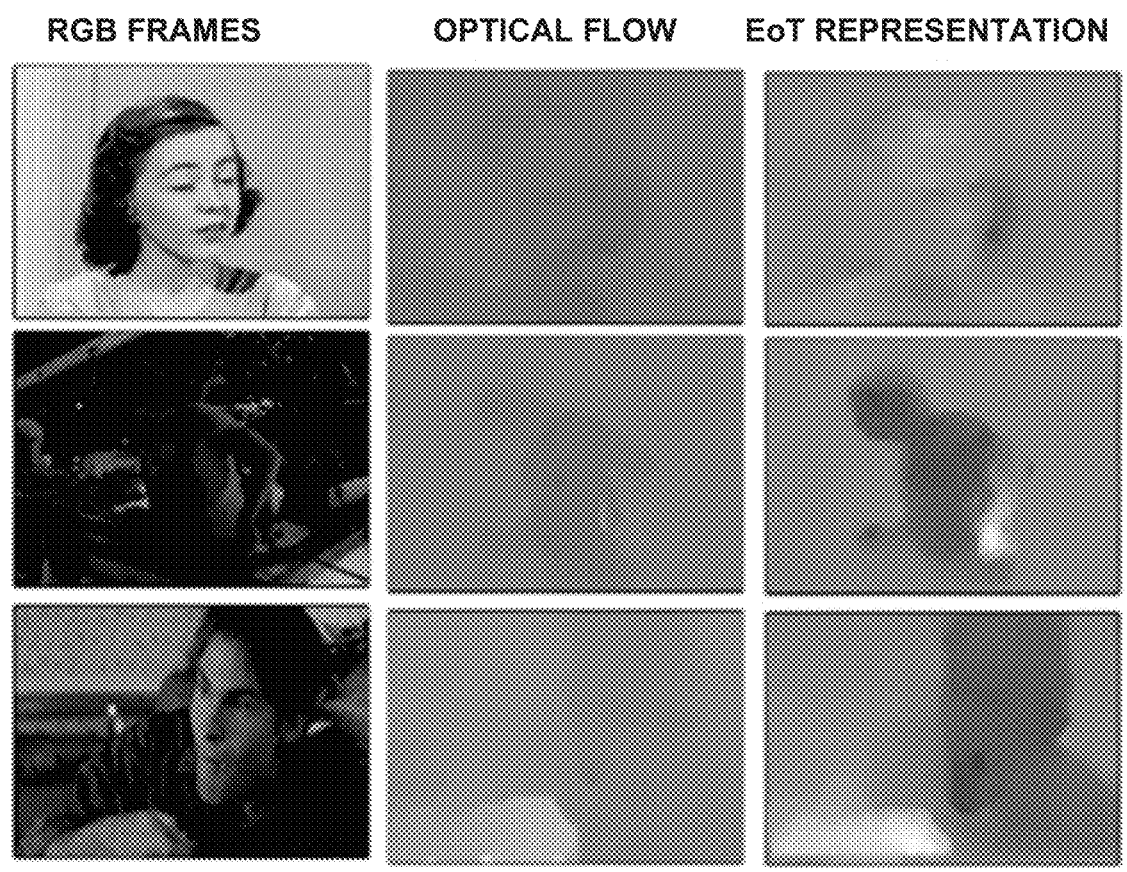
FIG. 8 shows additional example EoT temporal representations.

FIG. 7 and FIG. 8 show example EoT temporal representations. Example approaches disclosed herein are able to capture a longer range of temporal structures over frame stacking methods such as optical frames. Additionally, disclosed example approaches encode high-level motion dynamics, capturing the granular local motion patterns as they occur over an extended time interval. Disclosed example approaches effectively delineate a history of motion in the representations shown in FIG. 7 and FIG. 8. FIG. 7 and FIG. 8 illustrate detection differences between an optical flow approach, and the example approaches disclosed herein, when analyzing RGB frames. The example frames of the optical flow approach and the example approaches disclosed herein are represented as grayscale frames. Regions of higher contrast indicate better training data for a classification system. As shown, EoT based approaches are better able to define the subject, as well as highlight discriminative areas of motion.

Figure 9:
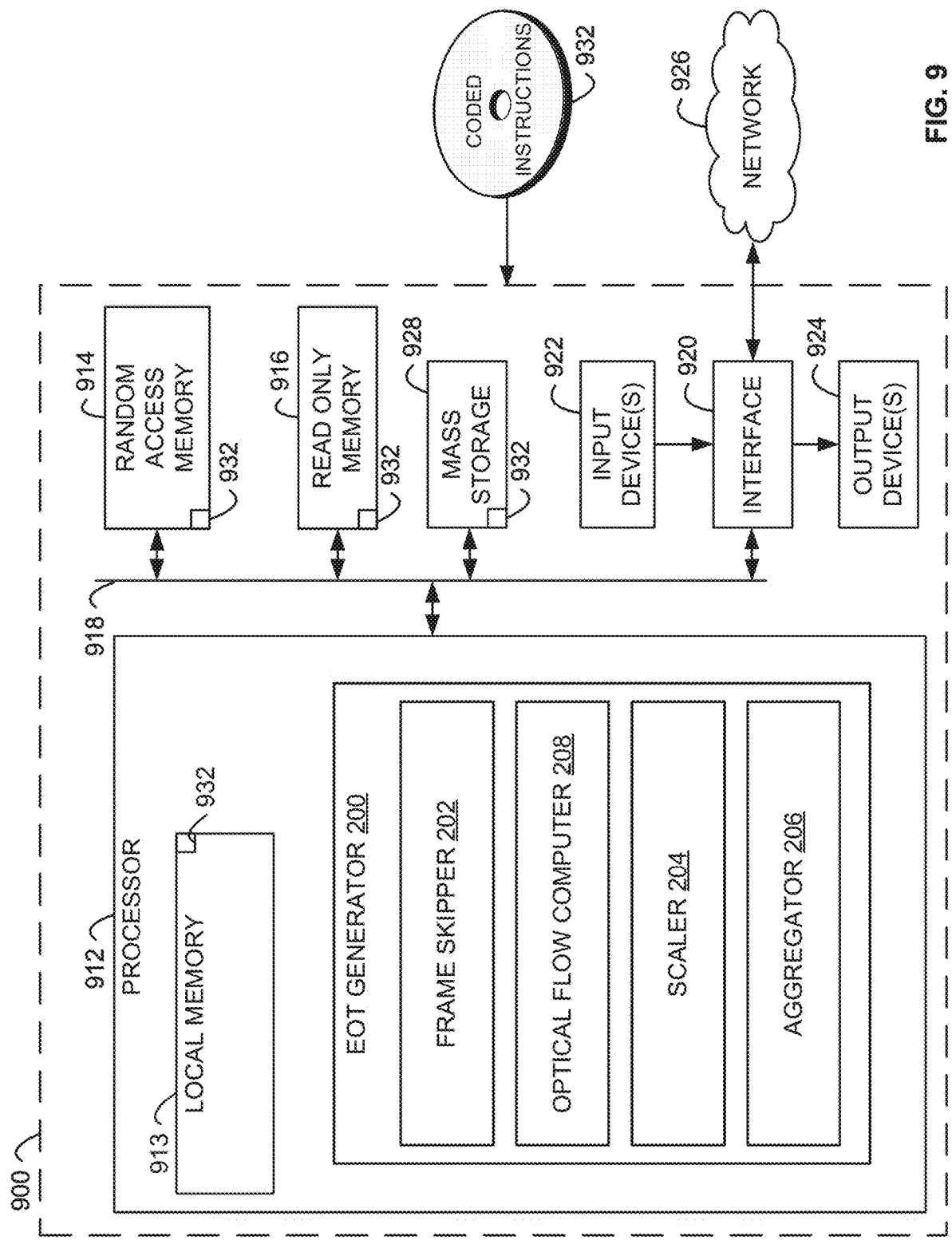
FIG. 9 illustrates an example processor platform structured to execute the example machine-readable instructions of FIG. 4 to implement the example EoT generator of FIG. 1 and/or FIG. 2.

FIG. 9 is a block diagram of an example processor platform 900 capable of implementing the example EoT generator 102 (see FIG. 1) and the example EoT generator 200 (see FIG. 2) and/or, more generally, the example action recognizer 100 (see FIG. 1). The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, an Internet of Things device, a smart-home device, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example EoT generator 102, 200, the example frame skipper 202, the example optical flow computer 208, the example scaler 204, and the example aggregator 206.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and DVD drives.

Coded instructions 932 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that enable improved video-based action recognition.

From the foregoing, it will be appreciated that example methods, apparatus and articles of manufacture have been disclosed that improve the accuracy of identification of action in video. From the foregoing, it will be appreciated that methods, apparatus and articles of manufacture have been disclosed which enhance the operations of a computer, a device having a processor, a smart home device, a security device, an electronic device, etc. to improve the accuracy of action identification performed on such a device. The disclosed methods, apparatus and articles of manufacture improve the efficiency of using a computing device by lowering the complexity of action identification. That is, through the use of these processes, computers can operate more efficiently by relatively quickly performing video based action identification. Furthermore, example methods, apparatus, and/or articles of manufacture disclosed herein identify and overcome inaccuracies and inability in the prior art to accurately perform action identification. The disclosed methods, apparatus and articles of manufacture are accordingly directed to one or more improvement(s) in the functioning of a device such as a computer.

Example methods, apparatus, and articles of manufacture to generate temporal representations for action recognition systems are disclosed herein. Further examples and combinations thereof include at least the following.

Example 1 is an apparatus that includes: an optical flow computer to: compute a first optical flow based on first and second video frames separated by a first amount of time, and compute a second optical flow based on third and fourth video frames separated by a second amount of time, the second amount of time different than the first amount of time; and an aggregator to combine the first optical flow and the second optical flow to form an image representing action in a video.

Example 2 is the apparatus of example 1, wherein the aggregator is to combine the first optical flow and the second optical flow by computing a sum of the first optical flow and the second optical flow.

Example 3 is the apparatus of example 2, wherein the aggregator is to compute the sum of the first optical flow and the second optical flow by computing a weighted sum of the first optical flow and the second optical flow.

Example 4 is the apparatus of example 1, further including a frame skipper to determine whether an amount of motion associated with fifth and sixth video frames satisfies a threshold, wherein the optical flow computer is to skip computing a third optical flow based on the fifth and sixth video frames when the amount of motion does not satisfy the threshold.

Example 5 is the apparatus of example 4, wherein the frame skipper is to determine the amount of motion by computing a joint entropy for the fifth and sixth frames.

Example 6 is the apparatus of example 4, wherein the frame skipper is to determine the threshold by computing a mean similarity for the video.

Example 7 is the apparatus of example 1, further including a scaler to normalize the first optical flow based on the first amount of time, and the second optical flow based on the second amount of time.

Example 8 is the apparatus of example 1, further including a convolutional neural network to identify an action in the video based on the image representing action in the video.

Example 9 is the apparatus of example 1, wherein the optical flow computer is a first optical flow computer, and further including: a second optical flow computer to: compute a third optical flow based on fifth and sixth video frames separated by a third amount of time, and compute a fourth optical flow based on seventh and eighth video frames separated by the third amount of time; a first convolutional neural network to identify a first action in the video based on the image representing action in the video; a second convolutional neural network to identify a second action in the video based on the third and fourth optical flows; and a fuser to identify a third action in the video based on the first action and the second action.

Example 10 is a method that includes: computing a first optical flow based on first and second video frames separated by a first amount of time; computing a second optical flow based on third and fourth video frames separated by a second amount of time, the second amount of time different than the first amount of time; and combining the first optical flow and the second optical flow to form an image representing action in a video.

Example 11 is the method of example 10, wherein combining the first optical flow and the second optical flow includes computing a sum of the first optical flow and the second optical flow.

Example 12 is the method of example 11, wherein computing the sum of the first optical flow and the second optical flow includes computing a weighted sum of the first optical flow and the second optical flow.

Example 13 is the method of example 10, further including: determining whether an amount of motion associated with fifth and sixth video frames satisfies a threshold; and skipping computing a third optical flow based on the fifth and sixth video frames when the amount of motion does not satisfy the threshold.

Example 14 is the method of example 10, further including: normalizing the first optical flow based on the first amount of time; and normalizing the second optical flow based on the second amount of time.

Example 15 is the method of example 10, further including applying machine learning to the image representing action in the video to identify an action in the video.

Example 16 is a non-transitory computer-readable storage medium storing instructions that, when executed, cause a machine to: compute a first optical flow based on first and second video frames separated by a first amount of time; compute a second optical flow based on third and fourth video frames separated by a second amount of time, the second amount of time different than the first amount of time; and combine the first optical flow and the second optical flow to form an image representing action in a video.

Example 17 is the non-transitory computer-readable storage medium of example 16, wherein the instructions, when executed, cause the machine to combine the first optical flow and the second optical flow by computing a sum of the first optical flow and the second optical flow.

Example 18 is the non-transitory computer-readable storage medium of example 16, wherein the instructions, when executed, cause the machine to: determine whether an amount of motion associated with fifth and sixth video frames satisfies a threshold; and skip computing a third optical flow based on the fifth and sixth video frames when the amount of motion does not satisfy the threshold.

Example 19 is the non-transitory computer-readable storage medium of example 16, wherein the instructions, when executed, cause the machine to: normalize the first optical flow based on the first amount of time; and normalize the second optical flow based on the second amount of time.

Example 20 is the non-transitory computer-readable storage medium of example 16, wherein the instructions, when executed, cause the machine to pass the image representing action in the video through a convolutional neural network to identify an action in the video.

Any references, including publications, patent applications, patents, etc. cited herein are hereby incorporated in their entirety by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   processor circuitry to execute the instructions to:
      compute an optical flow based on computing a difference between a pair of frames of a video, wherein a first frame in the pair of frames is a first image including a plurality of first pixels and a second frame in the pair of frames is a second image including a plurality of second pixels, the difference between the pair of frames is a difference between a location of ones of the plurality of first pixels that match ones of the plurality of second pixels and a location of ones of the plurality of second pixels that match the ones of the plurality of first pixels;
      normalize the optical flow based on image shifts between the plurality of first pixels in the first image and the plurality of second pixels in the second image to improve accuracy of a machine learning engine in predicting motion in the video based on the optical flow; and
      provide the optical flow to the machine learning engine to determine motion in the video based on the optical flow.

2. The apparatus of claim 1, wherein the processor circuitry is to execute the instructions to scale the optical flow by adjusting a magnitude of at least one pixel at a first location in the optical flow based on a mean intensity value of pixels in the optical flow over a time interval corresponding to the first frame and the second frame.

3. The apparatus of claim 1, wherein the processor circuitry is to execute the instructions to identify an action in the video based on the optical flow representing a motion between the pair of frames.

4. The apparatus of claim 1, wherein the optical flow is a first optical flow, the pair of frames is a first pair of frames, and the processor circuitry is to execute the instructions to compute a second optical flow based on computing a difference between a second pair of frames of video, wherein a third frame in the second pair of frames is a third image including a plurality of third pixels and a fourth frame in the second pair of frames is a fourth image including a plurality of fourth pixels, the difference between the second pair of frames is a difference between a location of ones of the plurality of third pixels that match ones of the plurality of fourth pixels and a location of ones of the plurality of fourth pixels that match ones of the plurality of third pixels.

5. The apparatus of claim 4, wherein the processor circuitry is to execute the instructions to normalize the second optical flow based on image shifts between the plurality of third pixels in the third image and the plurality of fourth pixels in the fourth image, the normalized first optical and the normalized second optical flow to represent a high-dimensional descriptor of both high and low level motion.

6. The apparatus of claim 1, wherein the machine learning engine is a convolutional neural network.

7. The apparatus of claim 1, wherein the machine learning engine is trained utilizing supervised learning.

8. At least one non-transitory computer readable storage medium comprising instructions that, when executed, cause at least one processor to at least:
   compute an optical flow based on computing a difference between a pair of frames of a video, wherein a first frame in the pair of frames is a first image including a plurality of first pixels and a second frame in the pair of frames is a second image including a plurality of second pixels, the difference between the pair of frames is a difference between a location of ones of the plurality of first pixels that match ones of the plurality of second pixels and a location of ones of the plurality of second pixels that match the ones of the plurality of first pixels;
   normalize the optical flow based on image shifts between the plurality of first pixels in the first image and the plurality of second pixels in the second image to improve accuracy of a machine learning engine in predicting motion in the video based on the optical flow; and
   provide the optical flow to the machine learning engine to determine motion in the video based on the optical flow.

9. The at least one non-transitory computer readable storage medium as defined in claim 8, wherein the instructions cause the at least one processor to scale the optical flow by adjusting a magnitude of at least one pixel at a first location in the optical flow based on a mean intensity value of pixels in the optical flow over a time interval corresponding to the first frame and the second frame.

10. The at least one non-transitory computer readable storage medium as defined in claim 8, wherein the instructions cause the at least one processor to identify an action in the video based on the optical flow representing a motion between the pair of frames.

11. The at least one non-transitory computer readable storage medium as defined in claim 8, wherein the optical flow is a first optical flow, the pair of frames is a first pair of frames, and the instructions cause the at least one processor to compute a second optical flow based on computing a difference between a second pair of frames of video, wherein a third frame in the second pair of frames is a third image including a plurality of third pixels and a fourth frame in the second pair of frames is a fourth image including a plurality of fourth pixels, the difference between the second pair of frames is a difference between a location of ones of the plurality of third pixels that match ones of the plurality of fourth pixels and a location of ones of the plurality of fourth pixels that match ones of the plurality of third pixels.

12. The at least one non-transitory computer readable storage medium as defined in claim 11, wherein the instructions cause the at least one processor to normalize the second optical flow based on image shifts between the plurality of third pixels in the third image and the plurality of fourth pixels in the fourth image, the normalized first optical and the normalized second optical flow to represent a high-dimensional descriptor of both high and low level motion.

13. The at least one non-transitory computer readable storage medium as defined in claim 8, wherein the machine learning engine is a convolutional neural network.

14. The at least one non-transitory computer readable storage medium as defined in claim 8, wherein the machine learning engine is trained utilizing supervised learning.

15. A method comprising:
computing, by executing an instruction with at least one processor, an optical flow based on computing a difference between a pair of frames of a video, wherein a first frame in the pair of frames is a first image including a plurality of first pixels and a second frame in the pair of frames is a second image including a plurality of second pixels, the difference between the pair of frames is a difference between a location of ones of the plurality of first pixels that match ones of the plurality of second pixels and a location of ones of the plurality of second pixels that match the ones of the plurality of first pixels;
normalizing, by executing an instruction with the at least one processor, the optical flow based on image shifts between the plurality of first pixels in the first image and the plurality of second pixels in the second image to improve accuracy of a machine learning engine in predicting motion in the video based on the optical flow; and
providing, by executing an instruction with the at least one processor, the optical flow to the machine learning engine to determine motion in the video based on the optical flow.

16. The method of claim 15, further including scaling the optical flow by adjusting a magnitude of at least one pixel at a first location in the optical flow based on a mean intensity value of pixels in the optical flow over a time interval corresponding to the first frame and the second frame.

17. The method of claim 15, further including identifying an action in the video based on the optical flow representing a motion between the pair of frames.

18. The method of claim 15, wherein the optical flow is a first optical flow, the pair of frames is a first pair of frames, and further including computing a second optical flow based on computing a difference between a second pair of frames of video, wherein a third frame in the second pair of frames is a third image including a plurality of third pixels and a fourth frame in the second pair of frames is a fourth image including a plurality of fourth pixels, the difference between the second pair of frames is a difference between a location of ones of the plurality of third pixels that match ones of the plurality of fourth pixels and a location of ones of the plurality of fourth pixels that match ones of the plurality of third pixels.

19. The method of claim 18, further including normalizing the second optical flow based on image shifts between the plurality of third pixels in the third image and the plurality of fourth pixels in the fourth image, the normalized first optical and the normalized second optical flow to represent a high-dimensional descriptor of both high and low level motion.

20. The method of claim 15, wherein the machine learning engine is a convolutional neural network.

21. The method of claim 15, wherein the machine learning engine is trained utilizing supervised learning.

* * * * *